April 11, 1939.  J. J. GOUGH  2,154,042

THERMOSTATICALLY CONTROLLED ELECTRIC HEATING APPLIANCE

Filed Sept. 18, 1937  3 Sheets-Sheet 1

Inventor
James J. Gough
By:- Cox & Moore attys

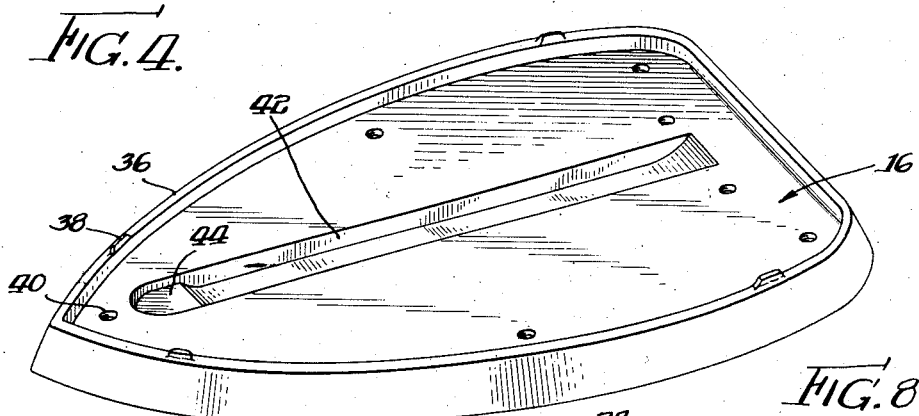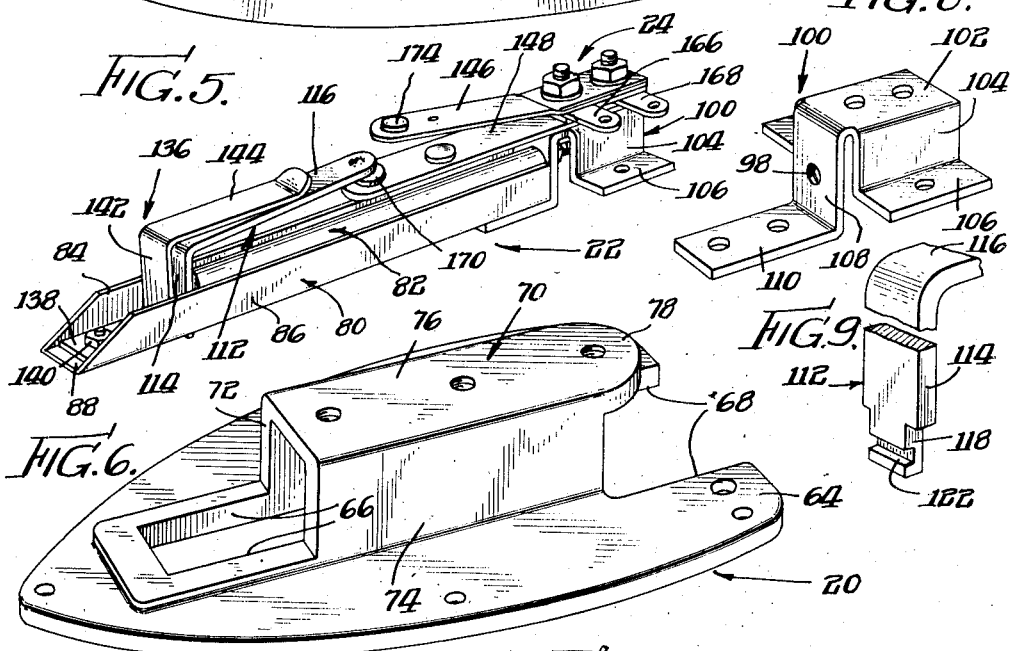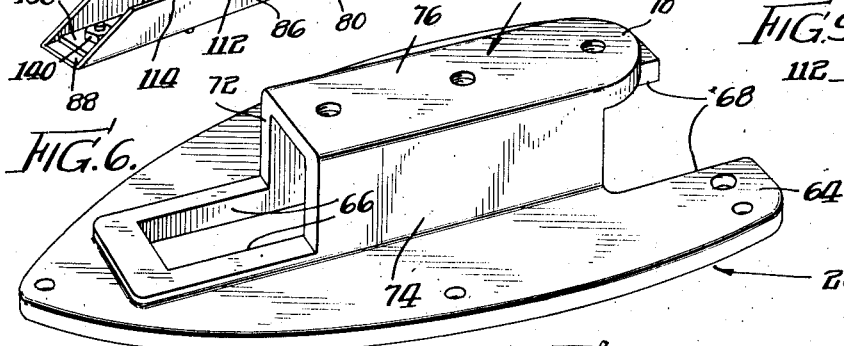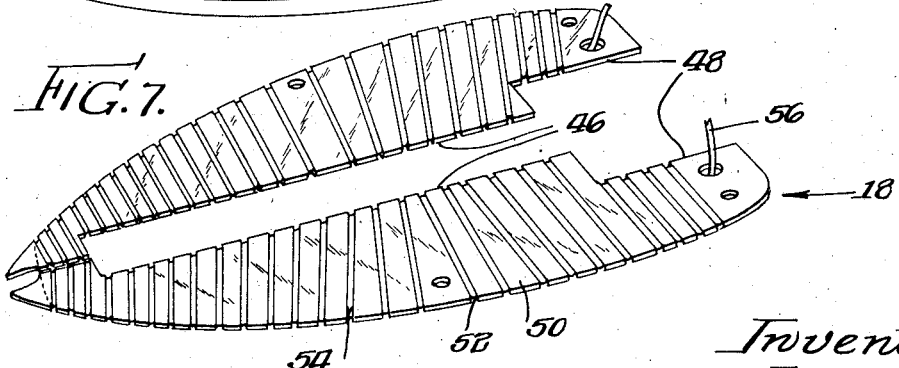

April 11, 1939.  J. J. GOUGH  2,154,042
THERMOSTATICALLY CONTROLLED ELECTRIC HEATING APPLIANCE
Filed Sept. 18, 1937   3 Sheets-Sheet 3
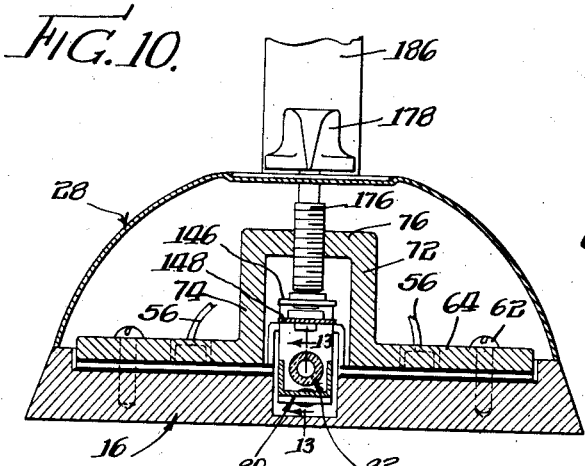
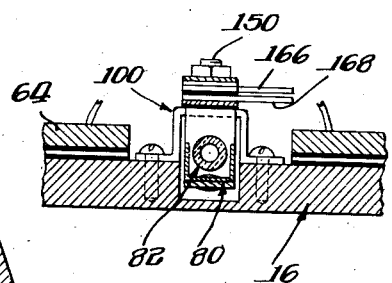
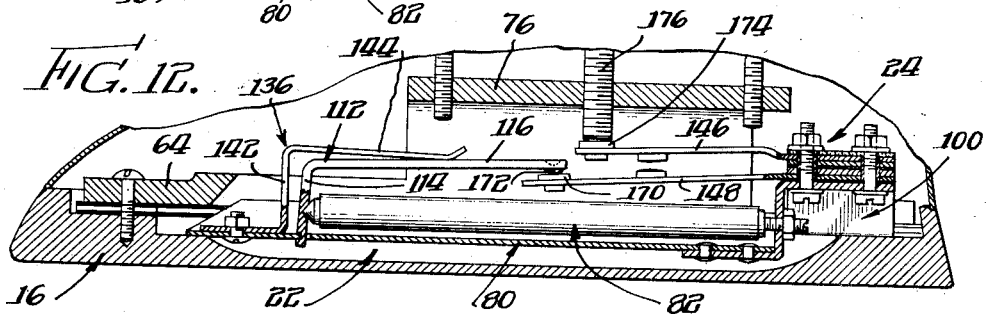
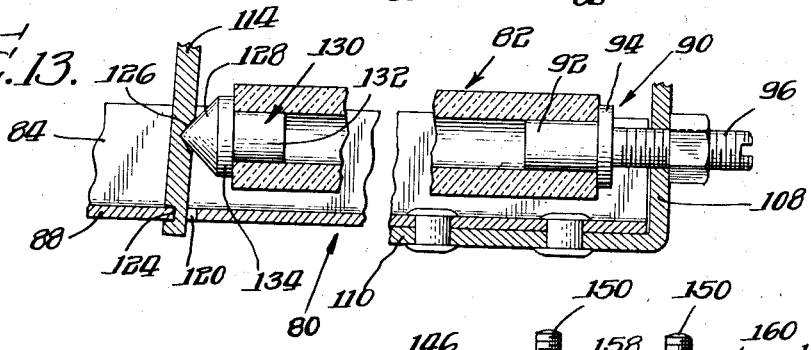
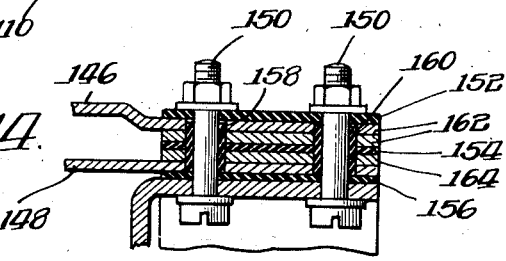
Inventor:-
James J. Gough
By:- Cox & Moore attys.

Patented Apr. 11, 1939

2,154,042

UNITED STATES PATENT OFFICE 2,154,042

THERMOSTATICALLY CONTROLLED ELECTRIC HEATING APPLIANCE

James J. Gough, Chicago, Ill., assignor to Chicago Electric Manufacturing Company, Chicago, Ill., a corporation of Illinois Application September 18, 1937, Serial No. 164,510

15 Claims. (Cl. 219—25)

This invention relates to a thermostat for electric heating appliances and more particularly to an electric flat iron embodying a thermostat for automatically making and breaking the circuit to the flat iron in response to variations in the temperature of said iron.

Thermostatic circuit controllers are particularly desirable in electric flat irons and in many other types of electric heating appliances such as electrical cooking and baking devices. These controllers usually include a bi-metallic strip which changes in shape in response to variations in the temperature of the heated element and this change in shape is employed to operate a switch which determines the energization of the heating element.

Bi-metallic strips, even when supplied by the same manufacturer with nominally the same two metals in each strip, vary considerably in their response to temperature changes because this response is affected to a considerable degree by extremely slight or minute variations in the thickness of the constituent strips, by the degree of purity of the two metals, and also by variations in the pressures exerted during welding of the constituent strips to each other.

Moreover, when such bi-metallic strips are exposed to an abnormally high temperature, even for a short period of time, they become distorted in shape and do not return to their original shape when subsequently cooled. This distortion in shape destroys the adjustment of the thermostatic control device of which the bi-metallic strip forms the main part and in many instances renders such control devices substantially useless.

The difference in the co-efficients of thermal expansion of the two constituent parts of a bi-metallic strip suitable for use at the temperature ranges of an electric flat iron, as for example steel and copper or bronze, is relatively small, being between 25% and 30%. Such strips when employed in electric irons are necessarily short in length and it is accordingly difficult to obtain sufficient change in shape to insure the requisite spacing of switch contacts when the circuit is open. A very delicate adjustment must be made at the time of manufacture to compensate for the variations in the original characteristics of such strips and this adjustment cannot be maintained even in normal use for the shape of the bi-metallic strip is affected by the pressure which in expanding it exerts against a cooperating part to open the circuit. This pressure is usually applied at an end portion of the strip in a direction substantially at right angles to the body of the strip and the reaction to this pressure therefore tends to distort the shape of the strip.

In order to alleviate these operating difficulties it has been proposed to space the strips of different metals parallel to each other and to connect them rigidly at one end, the slight difference in expansion of the two strips being amplified by a lever mechanism associated with the free ends of the strips. Because this requires pivot connections of the lever or levers to each strip, it is difficult to avoid lost motion, and, in addition, the end thrust on one or both of the strips necessitates the use of much heavier metal than formerly. The original manufacturing adjustments of such devices cannot be made before the bi-metallic strips have been fastened to the flat iron and the latter therefore interferes with the proper testing and adjusting of the thermostatic control device. In addition, the lost motion in the lever mechanism makes it difficult to maintain the proper adjustment.

It is an object of my invention to eliminate and overcome the above recited and other defects and shortcomings of the known thermostatic devices used, or proposed to be used, for controlling electric irons and similar heating appliances.

Another object is to provide a thermostatic control device embodying a metallic member and a vitreous member the co-efficient of expansion of which is much smaller than that of the metallic member, as for example steel and a magnesium aluminum silicate, or like vitreous material, the co-efficient of expansion of the latter being about one-third that of steel.

Another object is to provide a thermostatic control device of the above stated character in which the vitreous member is always maintained under longitudinal compression to prevent any possibility of rupturing such member while the metallic member is always maintained under longitudinal tension so that a strip of very thin metal will suffice.

Another object is to amplify without lost motion the relative movement of the metal and vitreous members of the thermostatic control device.

Other objects of the invention are to provide a compact and inexpensive thermostatic control device for electric irons or like heating appliances; to provide simple and durable connections between the temperature responsive means and the motion amplifying means of such thermostatic control device; to provide simple and effective resilient means for maintaining the several parts in proper operative relation; to provide simple, readily accessible means for adjusting the thermostatic control device for response to different desired temperatures; to provide a thermostatic control device in which the above described members and associated parts, together with a switch actuated thereby, may be assembled as a unit for testing and adjusting prior to attachment to the flat iron or other heating appliance with which it is to be used; to provide an electric heating appliance in which the temperature responsive members of the thermostatic control device are disposed quite near to the operative face of the heat applying member and in which the heat applying member supports both end portions of the temperature responsive members; to so shape the temperature responsive, metallic member that a quite thin strip of metal possesses sufficient rigidity and may form a protective housing for the temperature responsive, vitreous member and to provide a pressure or clamping plate of such construction that when assembled upon the sole plate of an electric flat iron it will form therewith a protective housing for the thermostatic control device.

Other and further objects and advantages of the invention will be apparent from the following description when taken in connection with the accompanying drawings, wherein:

Fig. 4 is a view in perspective of the sole plate of the iron.

Fig. 5 is a view in perspective of the thermostatic control unit.

Fig. 6 is a view in perspective of the pressure or clamping plate.

Fig. 7 is a view in perspective of the heating element.

Fig. 8 is an enlarged view in perspective of the attaching bracket of the thermostatic control unit.

Fig. 9 is an enlarged, fragmentary view in perspective of the switch control lever of the thermostatic control unit.

Fig. 10 is a transverse, vertical section taken along the line 10—10 of Fig. 1.

Fig. 11 is a fragmentary, transverse, vertical section taken along the line 11—11 of Fig. 1.

Fig. 12 is a fragmentary, longitudinal, vertical section similar to Fig. 1 but showing the control switch in open position.

Fig. 13 is an enlarged, fragmentary, vertical section taken along the line 13—13 of Fig. 10.

Fig. 14 is an enlarged sectional view of the right-hand portion of Fig. 12.

Figure 1:
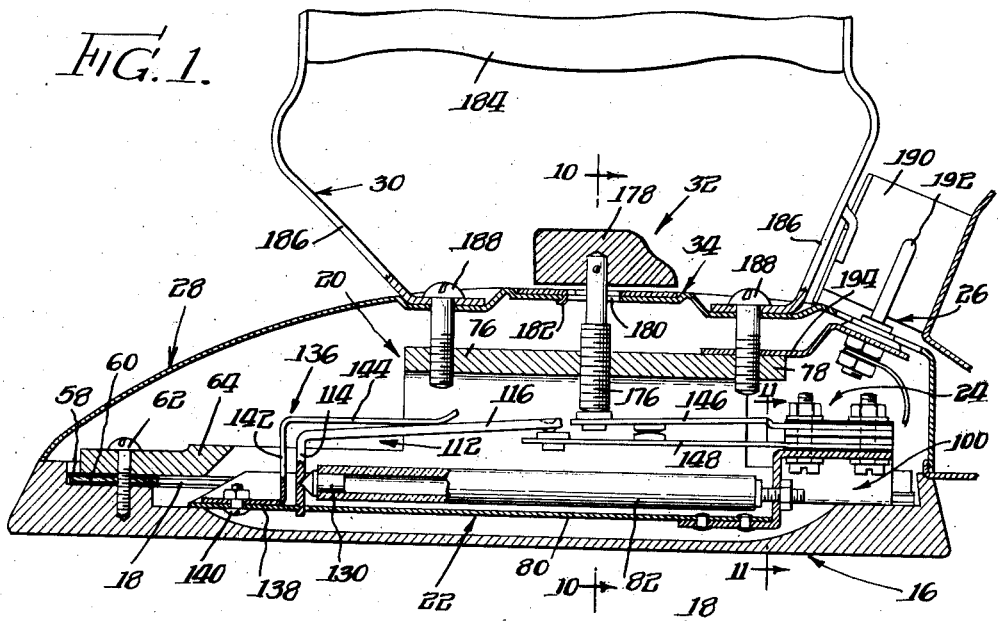
Fig. 1 is a longitudinal, vertical section through a thermostatically controlled electric flat iron illustrating my invention, the control switch being shown in closed position.
Figure 2:
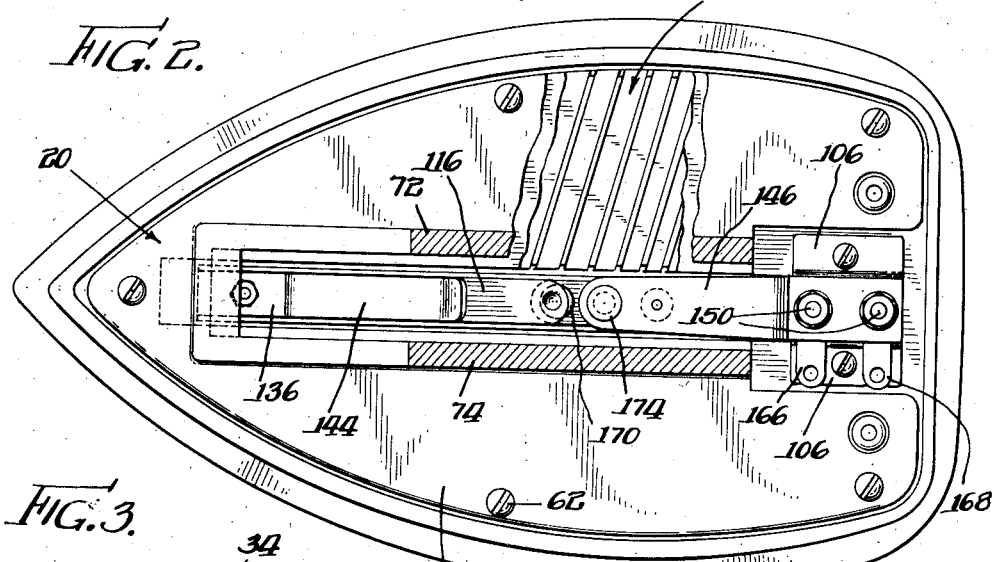
Fig. 2 is a plan view of the iron, certain parts being detached and others broken away for purposes of illustration.

As shown in Fig. 1 of the drawings, the embodiment selected to illustrate the invention comprises a heat applying member or sole plate 16, a heating element 18, a pressure or clamping plate 20, a thermostatic control unit 22 embodying a switch control unit 24, electric terminal means 26, a cover or shell 28, handle means 30, an adjusting device or control means 32 and an indicator or dial 34 associated with the adjusting device.

The heat applying member or sole plate 16, as best shown in Fig. 4, is of conventional shape and is provided with a peripheral flange 36, from which extends a plurality of lugs 38 for positioning the cover or shell 28 thereon. The sole plate is additionally provided with a plurality of threaded openings 40 and a central longitudinal groove or channel 42 terminating inwardly of the toe and heel of the sole plate and merging at its forward end into a depression or groove 44.

The heating element 18 may be of any conventional construction providing longitudinal slots or openings 46 and 48 to receive the thermostatic control unit 22. This heating element preferably comprises a sheet of suitable insulating material such as mica or the like 50 of a shape conforming to the shape of the sole plate and having vertical notches 52 in the edges thereof and transverse grooves 54 in its upper and lower faces. A suitable strip of conducting material 56 having the requisite resistance is wound about the sheet 50, within the notches 42 and grooves 54, and is connected, in a manner later to be described, to a switch 24 and the terminal means 26. The heating element 18 is mounted upon the upper surface of the sole plate 16 within the peripheral flange 36, is insulated from the sole plate by suitable sheets 58 and 60 (Fig. 1) of any desired insulating material, and is secured thereto by the clamping plate 20 and by suitable fastening means such as screws 62 (Fig. 1) passing through suitable openings in the clamping plate and the heating element and received in suitable ones of the threaded openings 40 in the sole plate.

The clamping or pressure plate 20 (as best shown in Fig. 6) comprises a base plate 64 of a shape similar to the sole plate and of a size to fit within the peripheral flange 36 of the sole plate. This clamping plate is provided with openings or slots 66 and 68 similar to the openings 46 and 48 in the heating element 18 to receive the thermostatic control unit and an integral, upwardly extending body portion 70 having side walls 72 and 74 extending upwardly from the sides of the slot 66, and a top wall 76 having an extended portion 78 overlying the opening 68. This channel-shaped body portion 70 forms, with the channel 42 and sole plate 16 and the openings 46 and 66 in the heating element and the base 64, respectively, a housing for the thermostatic control unit 22.

The thermostatic control unit 22, as shown herein for purposes of illustration, comprises temperature responsive members 80 and 82, the member 80 being a thin strip of metal, preferably steel, bent to form side walls 84 and 86 and a bottom wall 88 providing a channel-shaped, partial protective housing for the temperature responsive member 82, which is of any suitable vitreous or ceramic material, preferably a magnesium aluminum silicate having a co-efficient of expansion in the range of 20–100° C.—$1.88 \times 10^{-6}$; 20–600° C.—$2.76 \times 10^{-6}$ and consisting chiefly of cordierite crystals ($2MgO-2Al_2O_3-5SiO_2$) and commonly known as "Alsimag 202."

The vitreous member 82 is preferably tubular in form and is supported at one end by a plug 90 having a head 92 fitting into the internal bore of the vitreous material, a shoulder 94 against which the rear end of the tube abuts, and a threaded shank 96 received in a threaded opening 98 of a bracket or other suitable supporting means 100, best shown in Fig. 8.

The supporting means or bracket 100 may be of any desired or suitable form but preferably comprises a top portion 102, depending legs or walls 104 and oppositely directed laterally extending flanges 106. In addition the supporting means or bracket 100 includes a depending leg or extension 108 in which is located the threaded opening 98 and a forwardly projecting foot or flange 110. The bracket or supporting means 100 is secured to the upper surface of the heat applying member or the sole plate 16 in any suitable manner, as for example by screws passing through openings provided in the flanges 106 and threadedly received in suitable ones of the threaded openings 40 in the sole plate, the bracket being so positioned that the leg 108 and foot 110 extend into the channel 42 provided in the heat applying member or sole plate 16.

The temperature responsive member 80 may be fixedly secured to the foot 110 of the bracket beneath the member 82 in any desired manner, as for example by suitable rivets or the like passing through alined openings provided in the foot 110 and the rear end portion of the member 80. It will be seen from Fig. 5 that the walls 84, 86 and 88 of the metallic temperature responsive member 80 cooperate to form a housing for the vitreous, temperature responsive member 82, thereby protecting said member against breakage which might otherwise occur during assembly of the thermostatic control unit in the heating appliance or iron with which that control is to be associated.

Motion amplifying means is provided as a part of the thermostatic control unit and this means preferably comprises a lever 112 having an arm 114 and an arm 116 extending substantially at right angles to the arm 114. The free end portion of the arm 114 is reduced in width as at 118 and is received within a transverse slot 120 (Figs. 1, 12 and 13) formed in the bottom wall 88 of the metallic, temperature responsive member 80 adjacent the free end of said member. The reduced portion 118 is provided with a transverse recess or groove 122 to receive the forward edge 124 of the slot 120, the thickness of the edge 124 being slightly less than the width of the groove 122 in order that the lever 112 may pivot about that edge.

The arm 114 in its rear face and between the reduced portion 118 and the arm 116 is provided with a frusto-conical groove or recess 126 adapted to loosely receive the frusto-conical end portion 128 of a plug 130 having a cylindrical portion 132 received within the internal bore of the tubular, temperature responsive member 82 and a shoulder 134 which abuts the front edge of said tubular member.

Resilient means is provided for maintaining the motion amplifying means or lever 112 in proper position relative to the temperature responsive members 80 and 82, in which position the arm 114 is maintained in engagement with the edge 124 of the slot 120 and the plug 130 which forms a fulcrum for the lever is maintained in engagement therewith within the groove 126. This means comprises a strip 136 of spring steel or the like having a foot 138 fixedly secured to the base 88 of the temperature responsive member 80 as by a bolt 140, an upstanding leg 142 and a forwardly projecting arm 144 overlying and engaging the arm 116 of the lever 112 at an intermediate point in order to apply thereto a force constantly tending to rotate the lever in a clockwise direction, as seen in Figs. 1, 5 and 12.

The switch control unit 24 which forms a part of the thermostatic control unit 22 may be of any suitable construction, and preferably comprises a pair of spring contact blades 146 and 148 insulated from each other, from the top 102 of the bracket 100 and from the clamping bolts 150 by strips of any suitable insulation 152, 154 and 156, and insulating bushings 158 and 160, as best shown in Fig. 14. Wire receiving terminals for the switch blades 146 and 148 are provided by terminal blocks 162 and 164 interposed between the blades 146 and 148 and the strip of insulation 154, these terminal blocks being provided with suitable, laterally projecting wire receiving lugs 166 and 168, as best shown in Fig. 5.

The blade 146 constitutes the normally stationary but adjustable contact of the switch, while the blade 148 constitutes the normally movable blade of the switch which is operated by the lever 112 to make and break the circuit through the switch. The free end of the blade 148 extends beyond the blade 146 and carries a button 170 of suitable insulating material adapted to operatively engage the protuberance 172 formed at the free end of the arm 116 of the lever 112. The blade 146 at its free end carries a similar insulating button 174 which constantly engages the adjusting screw 176 of the adjusting device or means 32.

Figure 3:
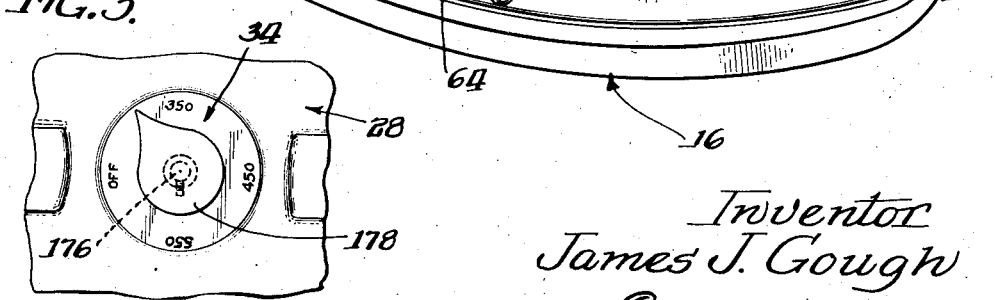
Fig. 3 is a fragmentary plan view of the adjusting device.

The adjusting device or means 32 comprises in addition to the adjusting screw 176, a manually operable knob 178 fixedly secured to the upper end of said adjusting screw. The adjusting screw 176 is threadedly received in the top wall 76 of the body portion 70 which, as previously described, constitutes an integral part of the clamping or pressure plate 20, and passes outwardly of the shell 28 through a suitable opening 180 provided therein. The manually operable knob is, or may be, provided with a suitable radial projection, protuberance or the like to form a pointer adapted to cooperate with the dial 34, which (as shown for purposes of illustration) comprises a suitable disk seated in a circular recess provided in the shell 28 about the opening 180 and carrying on its upper face suitable indicia such as shown in Fig. 3. The disk may be secured to the shell in any suitable manner, as for example by a downturned lug 182 pressed about the edge of the opening 180.

The handle means 30 may be of any conventional or preferred construction. As shown, this means comprises a handle 184 and handle supporting strips 186 secured to the shell 28 and the pressure or clamping plate 20 by any desired fastening means such as screws 188.

The electric terminal means 26, by which current is supplied to the iron, may be of any well known construction comprising the usual guard 190 secured to the shell 28 and prongs 192 extending into the guard 190 and supported on a plate 194 secured to the extended portion 78 of the body portion 70 of the clamping plate in a suitable manner, as by the rear screw 188.

The internal circuit for the electric iron is not shown, the same being conventional. It will suffice to state that one end of the wire 56 of the heating element 18 is connected directly to one of the prongs 192 while the other end of this wire is connected to one of the lugs 166 and 168 of the switch 24, the other one of these lugs being connected to the other terminal prong 192.

The thermostatic control unit 22 embodying the switch control unit 24 is assembled as follows. The metallic temperature responsive member 80 is first riveted at one end to the foot 110 of the bracket 100 and the vitreous temperature responsive member 82, in which the end plugs 90 and 130 have previously been inserted, is then placed in position within the member 80, the screw threaded portion 96 of the plug 90 being threaded into the leg 108 of the bracket 100. The switch control unit 24 may then be assembled in its proper position on the bracket 100. The motion amplifying means or lever 112 is then placed in its proper position, as shown in the drawings, and the temperature responsive member 92 adjusted forwardly of the member 80 to cause the tip of the plug 130 to seat properly within the frusto-conical groove 126 of said lever, and the protuberance 172 to be alined with the insulating button 170 carried by the switch blade 148. The spring strip 136 is then bolted in position and the assembly of the thermostatic control unit being completed, suitable tests and adjustments may then be made of this unit prior to its attachment to the electric iron or other heating appliance with which it is intended to be used. It is to be observed that the thermostatic control unit, in assembled position within the electric iron, is fixedly supported at one end as by suitable fastening means fastened to the flanges 108 of the bracket 100 and is slidably supported at its other end within the depression or groove 44.

The operation of the flat iron or other heating appliance with which the thermostatic control unit may be associated is as follows. Current is supplied to the heating element 18 through the switch blades 146 and 148 of the control switch 24 by way of the internal circuit previously described. As the temperature of the heat applying member or sole plate increases due to the action of the heating element, the temperature responsive members 80 and 82 of the thermostatic control unit expand linearly, the expansion of the member 80 per degree of temperature rise being considerably greater than the expansion of the member 82 per degree of rise in temperature. Accordingly the edge 124 of the opening 120 of the member 80 will move to the left relative to the tip of the plug 130 carried by the member 82 and the motion amplifying means or lever 112 under the action of the resilient means or spring 136 will be rotated clockwise about the fulcrum provided by the tip of the plug 130. The clockwise rotation of the lever 112 will of course move the switch blade 148 away from the switch blade 146 and thereby break the circuit to the heating element.

As the heat applying member or sole plate cools, the temperature responsive member 80 will of course contract at a more rapid rate than the member 82 and the edge 124 of the opening 120 in the first mentioned member will cause the lever 112 to be moved in a counterclockwise direction about the fulcrum provided by the plug 130 against the action of the spring 136. This will of course allow the resilient switch blade 148 to move upwardly into contacting engagement with the switch blade 146 and thereby reclose the circuit to the heating element. The temperature at which the switch will be operated to make or break the circuit will be determined by the adjustment of the adjusting device or means 32.

Clockwise rotation of the manually operable knob 178 (as seen in Fig. 3) causes the adjusting screw 176 and the switch blade 146 to be moved downwardly. The downward movement of the switch blade 146 will cause the corresponding downward movement of the blade 148 and it will thus be seen that the lever 112 will have to be moved through a greater angular degree in a clockwise direction to move the blade 148 out of engagement with the blade 146. With the manually operable knob 178 in its "off" position the switch blade 146 will be in its extreme upper position, in which position it cannot be engaged by the blade 148 and accordingly the circuit to the heating element cannot be completed.

It will be seen from the above description that applicant has provided a particularly simple, compact and efficient thermostatically controlled electric heating appliance embodying a metallic member and a vitreous member with different co-efficients of expansion, the former member being maintained under longitudinal tension and the latter under longitudinal compression.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. In an electric heating appliance having a heat applying member, a heating element, a supply circuit for said heating element, and a thermostatic control device comprising linearly expansible metallic and vitreous members having dissimilar coefficients of expansion, means for detachably securing corresponding ends of said metallic and vitreous members against movement relative to the heat applying member, the opposite ends of said metallic and vitreous members being shiftably supported on said heat applying member, means for controlling the energization of the supply circuit, and means responsive to the difference in expansion of said metallic and said vitreous members for actuating said control means.

2. In an electric heating appliance as defined in claim 1, in which means are provided for adjusting said controlling means to predetermine the temperatures at which the means responsive to the difference in expansion of said metallic and vitreous members may actuate said control means.

3. In an electric heating appliance having a heat applying member, a heating element and a supply circuit for said heating element, a thermostatic control device comprising metallic and vitreous members having dissimilar co-efficients of expansion and disposed in proximity to the heat applying member, means for fixedly securing one end of each of the metallic and vitreous members relative to the heat applying member, the other end of each of said metallic and vitreous members being shiftably supported on said heat applying member, shiftable means operatively associated with the other ends of the metallic and vitreous members and responsive to the difference in expansion of said members, and circuit control means operated by said shiftable means for controlling said supply circuit.

4. In an electric heating appliance having a heat applying member, a heating element, a supply circuit to said heating element, and a thermostatic control unit comprising linearly expandible metallic and vitreous members having dissimilar co-efficients of expansion, means for fixedly securing one end of each of said members to said heat applying member and to each other, the opposite end of one of said members being shiftably supported on said heat applying member, lever means connecting the corresponding end of the other member to said last mentioned member and amplifying the relative movement of said members, and a switch actuated by said lever for controlling said supply circuit.

5. In an electric heating appliance having a heat applying member, a heating element and a supply circuit to said heating element, a thermostatic control device comprising linearly expandible metallic and vitreous members having dissimilar co-efficients of expansion, means for fixedly securing one end of each of said members to said heat applying member and to each other, the opposite end of one of said members being shiftably supported on said heat applying member, a lever connecting the corresponding end of the other member to said last mentioned member and amplifying the relative movement of said members, a switch actuated by said lever means for controlling said supply circuit, and resilient means secured to one of said linearly expandible members and engaging said lever means for maintaining the latter in engagement with said switch and in engagement with said linearly expandible members.

6. In an electric heating appliance having a heat applying member, a heating element, a supply circuit for said heating element, and a thermostatic control unit detachably secured to said heat applying member, said unit comprising linearly expansible metallic and vitreous members having dissimilar coefficients of expansion, means for securing corresponding ends of said metallic and vitreous members against movement relative to said heat applying member, the opposite ends of said metallic and vitreous members being shiftably supported on said heat applying member, switch means for controlling said circuit, means responsive to the difference in expansion of said metallic and vitreous members for actuating said control means and means for constantly maintaining said vitreous member under longitudinal compression and said metallic member under longitudinal tension.

7. In an electric heating appliance having a heat applying member, a heating element, a supply circuit for said heating element, and a thermostatic control unit detachably mounted on said heat applying member, said unit comprising linearly expansible metallic and vitreous members having dissimilar coefficients of expansion, means for securing corresponding ends of said metallic and vitreous members against movement relative to said heat applying member, the opposite ends of said metallic and vitreous members being shiftably supported on said heat applying member, means for controlling the energization of said supply circuit, a lever fulcrumed on the vitreous member and operatively engaging the metallic member and said controlling means to actuate said controlling means in response to the difference in expansion of said metallic and vitreous members and resilient means operatively engaging said lever for maintaining said lever in engagement with said lever to constantly maintain said vitreous member under longitudinal compression and said metallic member under longitudinal tension.

8. In an electric heating appliance having a heat applying member, a heating element and a supply circuit to said heating element, a thermostatic control device comprising a linearly expandible vitreous member, a linearly expandible metallic member, said vitreous member being tubular and said metallic member being channel-shaped to form a housing for said tubular vitreous member, said metallic and vitreous members having dissimilar co-efficients of expansion, means for fixedly securing one end of each of said last mentioned members to said heat applying member and to each other, the opposite end of one of said members being shiftably supported on said heat applying member, a switch control unit comprising a relatively fixed contact member and a relatively movable contact member, and a lever fulcrumed on the vitreous member and operatively connected to the metallic member, said lever having a free end portion adapted to engage the relatively movable contact member for controlling said supply circuit.

9. In an electric heating appliance having a heat applying member, a heating element and a supply circuit to said heating element, a thermostatic control device comprising a linearly expandible vitreous member, a linearly expandible metallic member, said vitreous member being tubular and said metallic member being channel-shaped to form a housing for said tubular vitreous member, said metallic and vitreous members having dissimilar co-efficients of expansion, means for fixedly securing one end of each of said last mentioned members to said heat applying member and to each other, the opposite end of one of said members being shiftably supported on said heat applying member, a switch control unit comprising a relatively fixed contact member and a relatively movable contact member, a lever fulcrumed on the vitreous member and operatively connected to the metallic member, said lever having a free end portion adapted to engage the relativly movable contact member for controlling said supply circuit, and a spring secured to the metallic member and overlying said lever for maintaining the latter in engagement with the movable contact member and in engagement with said linearly expandible members.

10. In an electric heating appliance having a heat applying member, a heating element and a supply circuit for said heating element, a thermostatic control device comprising a linearly expandible member and a substantially non-expandible member, each of said last mentioned members being fixedly secured at one end to said heat applying member, the free end of one of said members being shiftably supported on said heat applying member, means connecting the free end of the other member to said shiftably supported member for amplifying the relative movement of said members, and means actuated by said motion amplifying means for controlling said supply circuit.

11. In an electric heating appliance having a heat applying member, a heating element and a supply circuit for said heating element, a thermostatic control device comprising a linearly expandible member and a substantially non-expandible member, means for fixedly securing one end of each of said members to said heat applying member and to each other, the free end of one of said members being shiftably supported on said heat applying member, a lever loosely connecting the free end of the other member to said shiftably supported member and amplifying the relative movement of said members, a switch actuated by said lever for controlling said supply circuit, and resilient means acting upon said lever for maintaining the latter in operative relation with said expandible and substantially non-expandible members.

12. In an electric heating appliance having a heat applying member, a heating element and a supply circuit for said heating element, a thermostatic control device comprising a linearly expandible member and a relatively non-expandible member, said expandible member forming a housing for said relatively non-expandible member, means for fixedly securing one end of each of said last mentioned members to said heat applying member and to each other, the free end of one of said members being shiftably supported on said heat applying member, a switch control unit comprising a relatively fixed contact member and a relatively movable contact member, a lever fulcrumed on the relatively non-expandible member and operatively connected to the expandible member, said lever having a free end portion adapted to engage the relatively movable contact member for controlling said supply circuit, and a spring secured to the linearly expandible member and overlying said lever for maintaining the latter in engagement with the movable contact member and in engagement with said linearly expandible member.

13. In an electric heating appliance having a heat applying member, a heating element and a supply circuit for said heating element, a thermostatic control device comprising a linearly expandible member and a substantially non-expandible member, each of said last mentioned members being fixedly secured at one end to said heat applying member, the free end of the expandible member being shiftably supported on said heat applying member, a lever fulcrumed on the free end of the substantially non-expandible member and connected to the expandible member for amplifying the relative movement of said members, and means actuated by said lever for controlling said supply circuit.

14. In an electric iron, a sole plate having a longitudinally extending groove, a heating element secured to said sole plate, said heating element having a slot therein in alinement with the groove in the sole plate, and a thermostatic control device detachably mounted as a unit on said sole plate, said thermostatic control device comprising a channel-shaped, linearly expansible metallic member extending through said slot and in said groove, a substantially non-expansible tube housed within said channel-shaped member, a bracket detachably secured to said sole plate and secured to one end of said channel-shaped member, means for adjustably securing the corresponding end of said tube to said bracket, the opposite end of said channel-shaped member being shiftably supported within the groove in the sole plate, a lever fulcrumed intermediate its ends upon said tube and operatively engaging at one end said channel-shaped member, and switch blades secured to said bracket and overlying said channel-shaped member and said tube, one of said blades operatively engaging the other end of said lever and actuated thereby in response to the expansion of said channel-shaped metallic member to disengage the other of said switch blades, said switch blades being electrically connected to said heating element to control the energization thereof.

15. In an electric iron, a sole plate having a longitudinally extending groove, a heating element secured to said sole plate, detachable means for clamping said heating element to said sole plate, said heating element having a slot therein in alinement with the groove in the sole plate, and a thermostatic control device detachably mounted as a unit on said sole plate, said thermostatic control device comprising a channel-shaped, linearly expansible metallic member extending through said slot and in said groove, a substantially non-expansible tube housed within said channel-shaped member, a bracket detachably secured to said sole plate and secured to one end of said channel-shaped member, means for adjustably securing the corresponding end of said tube to said bracket, the opposite end of said channel-shaped member being shiftably supported within the groove in the sole plate, a lever fulcrumed intermediate its ends upon said tube and operatively engaging at one end said channel-shaped member, switch blades secured to said bracket and overlying said channel-shaped member and said tube, one of said blades operatively engaging the other end of said lever and actuated thereby in response to the expansion of said channel-shaped metallic member to disengage the other of said switch blades, said switch blades being electrically connected to said heating element to control the energization thereof, and means carried by said clamping means for adjusting said switch blades to predetermine the temperatures at which the thermostatic comntrol device shall operate to control the heating element.

JAMES J. GOUGH.